United States Patent
Blanc et al.

(10) Patent No.: US 10,919,375 B2
(45) Date of Patent: Feb. 16, 2021

(54) ELECTRIC VEHICLE POWER UNIT MOUNTING PLATE

(71) Applicant: RENAULT s.a.s, Boulogne-Billancourt (FR)

(72) Inventors: Lionel Blanc, Chatillon (FR); Celine Lafoy, Saint Cyr l'ecole (FR)

(73) Assignee: RENAULT s.a.s, Boulogne-Billancourt (FR)

( * ) Notice: Subject to any disclaimer, the term of this patent is extended or adjusted under 35 U.S.C. 154(b) by 0 days.

(21) Appl. No.: 16/076,215

(22) PCT Filed: Jan. 31, 2017

(86) PCT No.: PCT/FR2017/050212
§ 371 (c)(1),
(2) Date: Aug. 7, 2018

(87) PCT Pub. No.: WO2017/137679
PCT Pub. Date: Aug. 17, 2017

(65) Prior Publication Data
US 2019/0016204 A1    Jan. 17, 2019

(30) Foreign Application Priority Data
Feb. 9, 2016 (FR) ...................................... 1651012

(51) Int. Cl.
*B60K 1/00* (2006.01)
*B60R 21/02* (2006.01)
(Continued)

(52) U.S. Cl.
CPC .............. *B60K 1/00* (2013.01); *B60R 21/026* (2013.01); *B60K 2001/0411* (2013.01);
(Continued)

(58) Field of Classification Search
CPC .............. B60K 1/00; B60K 2001/0494; B60K 2001/0411; B60K 2001/0488;
(Continued)

(56) References Cited

U.S. PATENT DOCUMENTS 8,276,698 B2 * 10/2012 Guss ........................ B60K 1/04
180/68.5
8,336,657 B2 * 12/2012 Dobbins ................. B60R 25/00
180/68.5
(Continued)

FOREIGN PATENT DOCUMENTS

EP        2 189 317 A1    5/2010
WO    WO 2015/146267 A1    10/2015

OTHER PUBLICATIONS

International Search Report dated May 3, 2017 in PCT/FR2017/050212 filed Jan. 31, 2017.

*Primary Examiner* — James M Dolak
(74) *Attorney, Agent, or Firm* — Oblon, McClelland, Maier & Neustadt, L.L.P.

(57) ABSTRACT

A device that supports a motor vehicle component includes a plate that is equipped with a securing device for securing a protective casing of the component and an attachment device for attaching to a structural element of the chassis of the motor vehicle. The attachment device is designed to break in the event of a collision involving the motor vehicle. The support device also includes a deflector that forms a ramp tilted upwards, one end of which extends at the height of the plate and an opposing end of which is tilted relative to the plate. This support device helps protect the occupant in case of a frontal impact collision by preventing rigid members from stacking up in a critical manner in the engine compartment.

9 Claims, 3 Drawing Sheets

Figure 1:
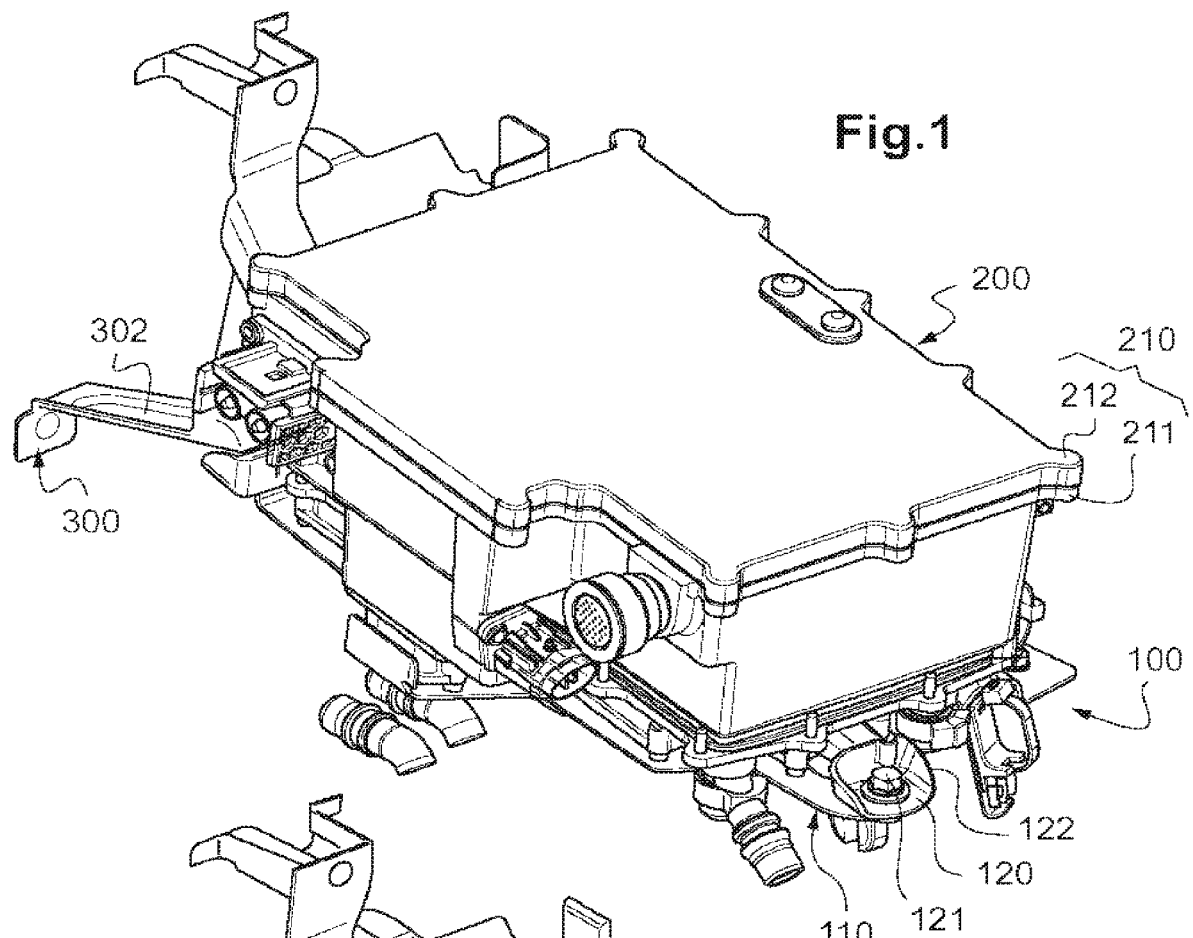

(51) Int. Cl.
*B60K 1/04* (2019.01)
*B60R 21/00* (2006.01)

(52) U.S. Cl.
CPC ............... *B60K 2001/0494* (2013.01); *B60R 2021/0004* (2013.01); *B60R 2021/0266* (2013.01); *B60Y 2306/01* (2013.01)

(58) Field of Classification Search
CPC .......... B60R 21/026; B60R 2021/0266; B60R 2021/0004; B62D 21/15; B62D 21/152; B62D 21/155; B62D 21/157
See application file for complete search history.

(56) References Cited

U.S. PATENT DOCUMENTS

| | | | | |
|---|---|---|---|---|
| 8,871,372 | B2* | 10/2014 | Eckstein | B60R 16/04 |
| | | | | 429/120 |
| 8,905,171 | B2* | 12/2014 | Lee | H01M 2/1077 |
| | | | | 180/68.5 |
| 9,162,559 | B2* | 10/2015 | Arisawa | B60K 1/04 |
| 9,394,004 | B2* | 7/2016 | Gotou | B60K 1/00 |
| 9,409,470 | B2* | 8/2016 | Trentin | B60K 1/04 |
| 9,517,686 | B1* | 12/2016 | Paramasivam | H01M 2/1083 |
| 9,648,764 | B2* | 5/2017 | Nakashima | H05K 5/0204 |
| 9,937,780 | B2* | 4/2018 | Murata | B60K 1/04 |
| 10,093,183 | B2* | 10/2018 | Murata | H01M 8/04111 |
| 10,507,736 | B2* | 12/2019 | Katano | B60L 58/40 |
| 10,518,619 | B2* | 12/2019 | Baba | B60K 1/00 |
| 10,597,082 | B2* | 3/2020 | Hoke | B62D 25/00 |
| 2011/0162902 | A1 | 7/2011 | Dobbins et al. | |
| 2012/0015257 | A1 | 1/2012 | Arisawa et al. | |
| 2017/0096067 | A1 | 4/2017 | Murata | |

\* cited by examiner

ELECTRIC VEHICLE POWER UNIT MOUNTING PLATE

TECHNICAL FIELD TO WHICH THE INVENTION RELATES

The present invention is concerned in a general manner with the protection of certain of the members of a motor vehicle in the event of a collision, in particular in the event of a frontal impact.

It is more particularly concerned with a support device for supporting a motor vehicle component.

It is also concerned with a motor vehicle comprising such a support device.

TECHNOLOGICAL BACKGROUND

In the event of a collision of a vehicle against an arbitrary obstacle, it may occur that a plurality of members of the vehicle strike one another, in particular when the chassis of the vehicle crushes to absorb the energy of the impact.

This is particularly the case with the members situated in the engine compartment in the event of a frontal impact.

These members, which are often very stiff, risk stacking up against one another, creating a large incompressible volume in the engine compartment. This is problematic for the protection of the occupant.

Specifically, a large incompressible volume in the engine compartment will limit the crushing of the front of the vehicle. This has two main consequences.

On the one hand, the front of the vehicle will absorb less energy, which will then be transferred to the passenger compartment. The passenger compartment will therefore deform more than desired (as a reminder, the passenger compartment is the occupant's "survival cage").

On the other hand, these members stacked up against one another in an incompressible manner risk entering the front part of the passenger compartment, which generates a risk for the occupant.

In order to improve the behavior of the members with respect to one another in the engine compartment, document JP2006088871 discloses a particular fastening system for fastening a propulsion unit to the chassis of the vehicle. In this fastening system, certain elements are designed to break in the event of an impact such that, during a frontal collision, the propulsion unit can tilt about a pivot axis so as not to be damaged. Unfortunately, given the large number of members present under the hood of the vehicle, it is not always possible to have sufficient space available to use this fastening system.

Moreover, this fastening system proves expensive to implement.

SUBJECT OF THE INVENTION

The present invention thus proposes a support device for supporting a motor vehicle component, in which there is provided:
   a mounting plate which is equipped with means for securing said component and with means for fastening to a structural element of the motor vehicle, said fastening means being designed to break in the event of a collision of the motor vehicle, and
   a deflector which forms an upwardly inclined ramp, an end portion of which extends at the height of the mounting plate and an opposite end of which is inclined with respect to the mounting plate.

Thus, by virtue of the invention, in the event of an impact, the mounting plate and the component which it supports will detach from the structural element, will slide against the deflector and will then be ejected by the ramp.

The deflector will thus make it possible to avoid the stacking up of the component with the other components of the vehicle in the engine compartment.

Thus, this support means may be used to help protect the occupant.

Other advantageous and nonlimiting features of the support device according to the invention are the following:
   said fastening means are intended to break when the support device experiences a force above a predetermined threshold;
   said fastening means comprise at least one rivet;
   said fastening means are adapted, in the event of breakage, to fully release the mounting plate from the structural element of the chassis;
   the mounting plate is for the most part planar and has at least one edge folded at a right angle.

The invention is also concerned with a motor vehicle comprising:
   structural elements (of the chassis, of the propulsion unit, etc.),
   a component comprising a protective casing, and
   a support device as already mentioned, the securing means of which are fastened to said protective casing and the fastening means of which are fastened to one of said structural elements.

Advantageously, the deflector is fastened to, or is integrally formed with, a structural element of the vehicle which is separate from the structural element to which the mounting plate is fastened.

Advantageously still, the vehicle comprises at least one electric traction motor of the motor vehicle, and said "component" comprises an electronic power unit adapted to control the intensity of the current transmitted to the electric motor.

Preferably, there are provided braking means for braking the motor vehicle, at least a part of which is situated behind the deflector, on the opposite side to the protective casing.

DETAILED DESCRIPTION OF AN EXEMPLARY EMBODIMENT

Figure 2:
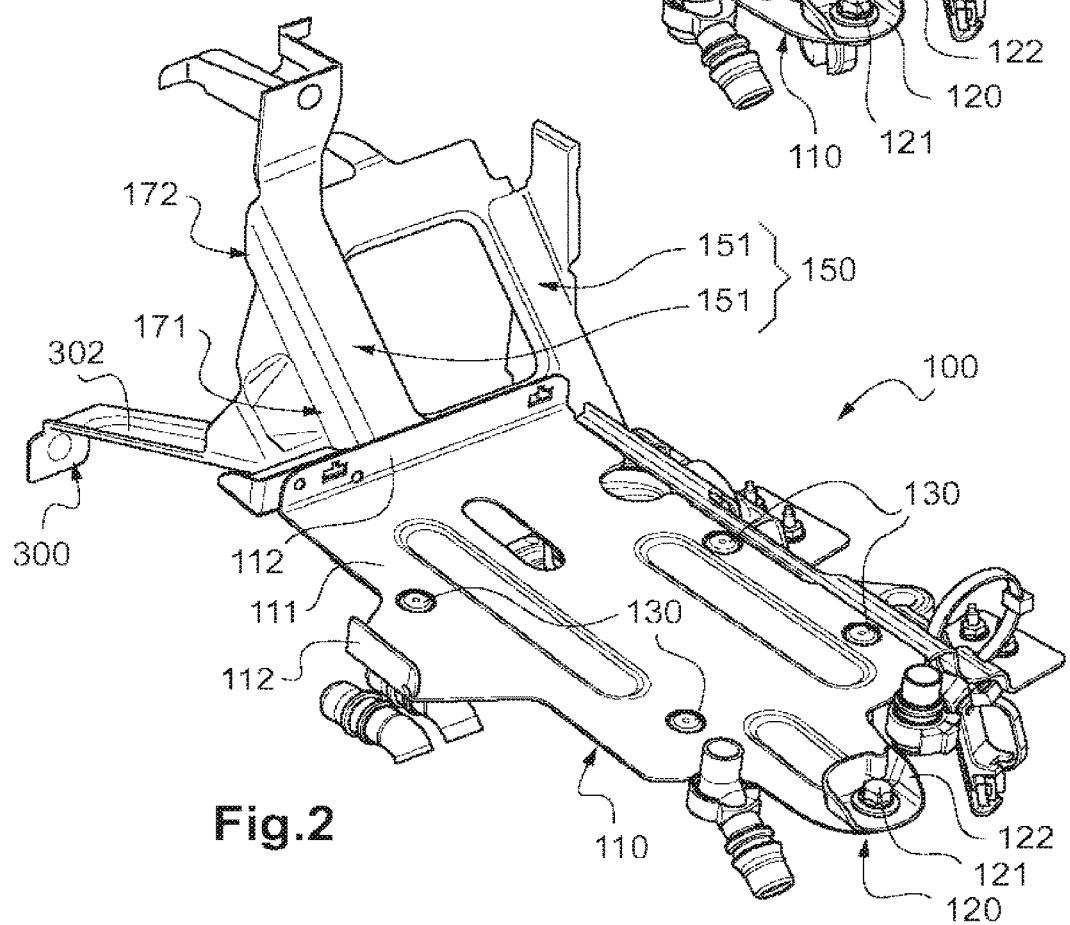
Figure 3:
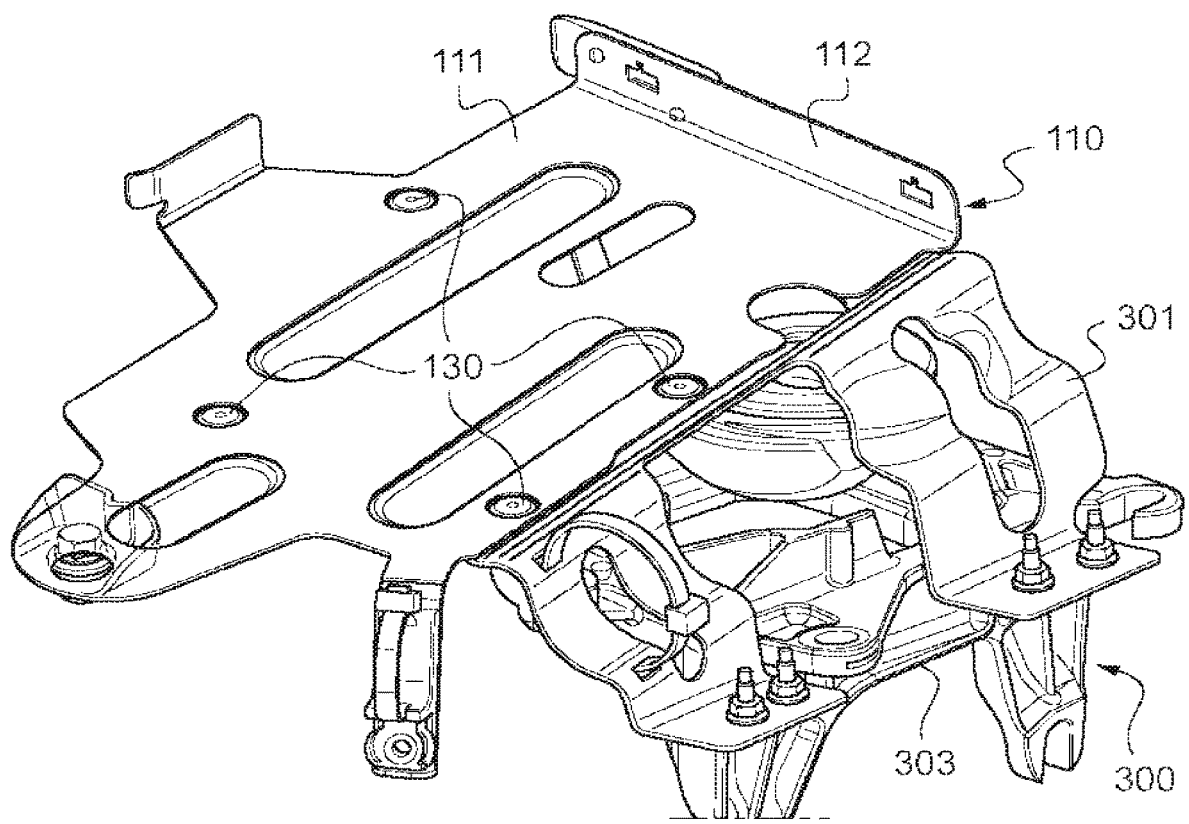

The description which will follow with reference to the appended drawings, which are given by way of nonlimiting examples, will give a clear understanding of what constitutes the invention and how it can be implemented.
In the appended drawings:
   FIG. 1 is a perspective schematic view of a motor vehicle component fastened to a support device according to the invention;
   FIG. 2 is a perspective schematic view of the support device of FIG. 1;
   FIG. 3 is a perspective schematic view of the mounting plate of the support device of FIG. 1, represented at another angle; and
   FIG. 4 is a schematic view of the motor vehicle.

Figure 4:
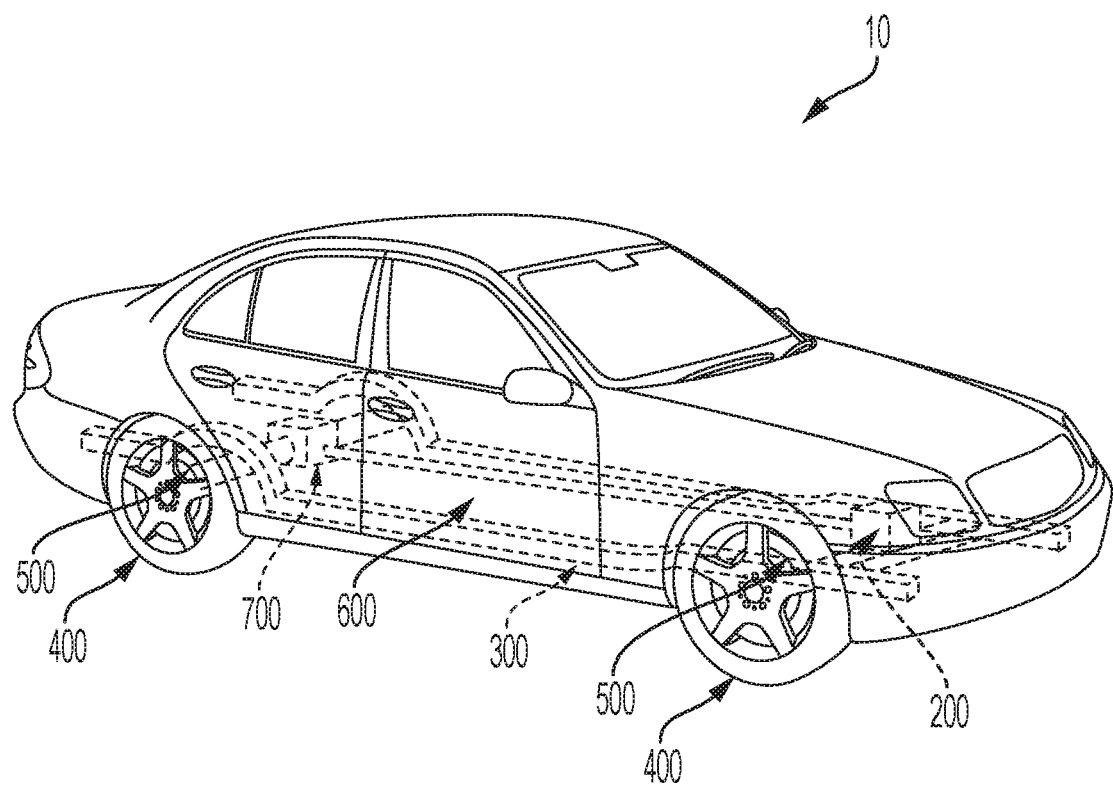

Conventionally, as shown schematically in FIG. 4, a motor vehicle 10 comprises wheels 400 and a chassis 300 which supports in particular a propulsion unit, such as an electronic power unit 200, elements for transmitting torque from the propulsion unit, such as an electric traction motor 700, to the driving wheels, a braking system 500, body elements and passenger compartment elements 600.

It may be considered here that the propulsion unit of the motor vehicle is either electric (that is to say without an internal combustion engine) or hybrid (that is to say comprising an electric motor and an internal combustion engine).

In these two cases, the propulsion unit then comprises an electric traction chain which comprises at least one electric motor, a battery of accumulators (called traction battery) and an electronic power unit.

This electronic power unit is intended to control the intensity of the current transmitted to the electric motor by the traction battery.

It additionally comprises a DC-DC voltage converter for lowering the voltage at the terminals of the traction battery (which is generally above 300 V) to a voltage equal to that of the low-voltage network of the vehicle (generally of the order of 14 V).

FIG. 1 depicts a particular component of the motor vehicle, namely this electronic power unit 200. As this figure shows, the electronic power unit 200 comprises a casing 210 which houses and protects the electronic components (not visible) of the electronic power unit 200.

This casing 210 is here composed of a base 211 and of a cover 212 which closes the base 211.

In the remainder of the description, the terms "front" and "rear" will be used with respect to the motor vehicle, the rear of an element designating the side of this element which is directed toward the trunk of the vehicle and the front designating the opposite side.

It will be considered here that the electronic power unit 200 is situated in the engine compartment of the vehicle, in front of a component of the braking system of the vehicle.

It will then be understood that, in the event of frontal collision, when the chassis of the vehicle crushes to absorb the energy of the impact, the risk is that the casing 210 of the electronic power unit 200 will strike the brake member, then creating a large incompressible volume in the engine compartment, causing the passenger compartment to deform in an unfavorable manner.

According to a particularly advantageous feature of the invention, as shown in FIG. 2, this support device 100 comprises two main elements, namely a mounting plate 110 and a deflector 150. The mounting plate 110 comprises securing means 120 for retaining the casing 210 of the electronic power unit 200, and fastening means 130 to be fastened to a structural element of the vehicle and designed to break in the event of a collision. The deflector 150 for its part forms a ramp, an end part 171 of which extends at the height of the mounting plate 110 and an opposite end 172 of which is inclined with respect to the mounting plate 110.

In the embodiment depicted in the figures, the mounting plate 110 is for the most part planar. It is formed by a plate which comprises a substantially rectangular bottom 111, at least a part of at least one of the edges of which is folded upward at a right angle (with a nonzero radius resulting from a rounded folding), to form a lip 112.

Here, the front edge of the bottom 111 of the mounting plate 110 is completely folded upward at a right angle, and the left edge of this bottom comprises a part folded upward at a right angle.

Whereas the bottom 111 forms a base for the casing 210 of the electronic power unit 200, the lips 112 form stops for keeping the casing in place. The lip 112 situated at the rear of the mounting plate 110 is particularly important since, in the event of a frontal collision, it prevents the casing from sliding with respect to the mounting plate 110.

The means 120 for securing the casing 210 of the electronic power unit 200 on the mounting plate 110 may take very diverse forms.

As shown in FIG. 1, they here comprise a screw 121 which passes through a hole made in the mounting plate 110 and which is screwed into a nut (not visible) situated below the mounting plate 110. They also comprise a tab 122 which is adapted to press a part of the casing 210 against the mounting plate 110.

As is shown in FIG. 2, these securing means 120 also comprise holes made in the mounting plate 110 that make it possible to hook the casing 210 therein before screwing the screw 121.

The means 130 for fastening the mounting plate 110 to the chassis 300 may also take quite diverse forms, provided that they break in the event of an impact.

As is shown in FIG. 3, these fastening means 130 are here formed by four rivets.

These rivets 130 make it possible to fasten the mounting plate 110 to a structural element 301 composing the chassis 300 of the vehicle. This structural element 301 is here formed by a rigid sheet bolted onto the engine support 303.

The rivets 130 are engaged through openings provided in the bottom 111 of the mounting plate 110 such that their heads bear on the top of the mounting plate 110 and their shanks can hook below the structural element 301.

These rivets 130 are intended to break when the support device 100 experiences a deceleration above a predetermined threshold. This threshold will preferably be greater than or equal to 10 m·s$^{-2}$.

In this way, in the event of a relatively nonviolent collision, the rivets 130 are intended not to yield, with the result that the casing 210 of the electronic power unit 200 remains securely fastened to the chassis of the vehicle.

On the other hand, in the event of a more violent collision, the four rivets 130 are intended to yield so as to completely release the mounting plate 110 from the structural element 301.

The deflector 150, which is intended to deflect the casing 210 from its path in the event of impact, may take diverse forms. It may thus take the form of a planar plate or of a curved plate.

However, here, as shown in FIG. 2, the deflector 150 is composed of three sheets 151 which are stamped and then welded.

This assembly of 3 welded stamped sheets 151 is screwed to the chassis.

This assembly then forms a ramp intended to deflect the mounting plate 110 and the casing 210 from their natural paths in the event of a frontal collision.

For this purpose, this ramp has a first end 171 which extends at the level or beneath the front edge of the mounting plate 110, whereas the second end 172 of the ramp extends to a greater height.

Therefore, in the event of a violent impact, when the rivets 130 yield, the rear edge of the mounting plate 110 is intended to slide along the ramp toward the second end 172, thereby making it possible for the mounting plate 110 to be ejected above the deflector 150 in the direction of the passenger compartment.

In a preferred manner, the structural element 302 to which the deflector 150 is fastened is separate from the structural element 301 to which the mounting plate 110 is fastened. Specifically, the structural element 302 is secured to the chassis 300 of the vehicle, whereas the element 301 is secured to a support of the motor, or motor frame, which is decoupled from the chassis by antivibration means.

In this way, in the event of an impact, when the chassis 300 crushes, the two structural elements 301, 302 (situated one in front of the other) approach one another, thereby promoting the ejection of the mounting plate 110.

During this impact, the ramp can even force the front of the mounting plate 110 to lift in such a way as to force the rivets 130 to yield.

The invention claimed is:

1. A support device for supporting a motor vehicle component, comprising:
    a mounting plate which is equipped with means for securing said component and with means for fastening to a first structural element of a motor vehicle, said fastening means break when said support device experiences a force above a predetermined threshold, the mounting plate includes a lip at a rear edge of the mounting plate, and the lip is folded upwardly at a right angle, and
    a deflector which forms an inclined ramp that includes a first end part, which is positioned at or below a height of the mounting plate, and the ramp extends upwardly from the first part to a second end, which is positioned above and to the rear of the rear edge of the mounting plate.

2. The support device as claimed in claim 1, in which said fastening means comprise at least one rivet.

3. The support device as claimed in claim 1, in which, when said fastening means are broken, the mounting plate is fully released from said first structural element.

4. A motor vehicle comprising:
    the component comprising a protective casing, and
    the support device as claimed in claim 1, the securing means of which are fastened to the protective casing of the component.

5. The motor vehicle as claimed in claim 4, in which the deflector is fastened to, or is integrally formed with, a second structural element of the motor vehicle, the second structural element being separate from the first structural element to which the mounting plate is fastened.

6. The motor vehicle as claimed in claim 4, in which said component comprises an electronic power unit.

7. The motor vehicle as claimed in claim 4, in which there are provided brakes for the motor vehicle, at least a part of which is situated behind the deflector.

8. The support device as claimed in claim 1, in which the predetermined threshold above which the fastening means break is greater than or equal to 10 meters/second squared.

9. The support device as claimed in claim 1, in which said means for securing include a tab and holes in the mounting plate.

* * * * *